D. C. Ripley.

Glass Lamp.

No 3035 Reissued Jul. 14, 1868.

Inventor.
D. C. Ripley
by
Marcus Fenwick & Lemaire

Witnesses
R. H. Campbell
Edwin Holmes

United States Patent Office.

RIPLEY AND COMPANY, OF PITTSBURG, PENNSYLVANIA, ASSIGNEES OF DANIEL C. RIPLEY, OF SAME PLACE.

*Letters Patent No.* 73,122, *dated January* 7, 1868; *reissue No.* 3,035, *dated July* 14, 1868.

DIVISION No. 2.

IMPROVED GLASS LAMP.

The Schedule referred to in these Letters Patent and making part of the same.

TO ALL WHOM IT MAY CONCERN:

Be it known that DANIEL C. RIPLEY, of Pittsburg, in the county of Allegheny, and State of Pennsylvania, did invent a new and improved Lamp; and we do hereby declare that the following is a full, clear, and exact description of that part of the invention which relates to Division No. 2, reference being had to the accompanying drawings, making a part of this specification, in which—

Similar letters of reference indicate corresponding parts in the several figures.

This invention relates to a new and improved mode of producing hand-lamps, or lamps which are constructed with handles.

It consists in producing the base and handle or handles by pressing the glass in suitable moulds, and then forming the bowl or oil-reservoir by blowing the glass upon said pressed base and handle or handles, thereby admitting of lamps being manufactured with great facility, and made much stronger than under the old process, as will be hereinafter explained.

To enable others skilled in the art to understand this invention, we will describe its construction and operation.

The drawings represent a glass lamp, which is constructed with a conical base, A, two handles, B B, which are diametrically opposite each other, and a hollow bowl or oil-reservoir, C. The glass base A, and the two handles B B, are produced in one piece by the well-known process of casting and pressing glass in moulds. This makes a very strong and substantial base-support for the lamp-bowl, and unites the handles and lamp-bowl together in one homogeneous piece. The bowl C is then produed by blowing it upon the upper edges of the handles and base.

Figure 2:
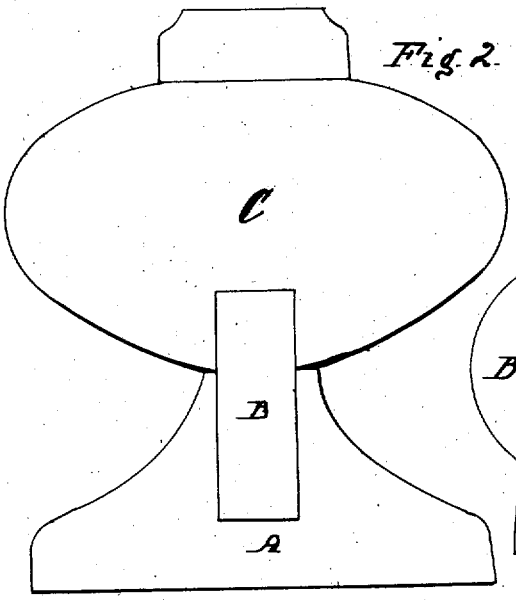
Figure 2 is a side elvation, showing an edge view of one handle only.
Figure 3:
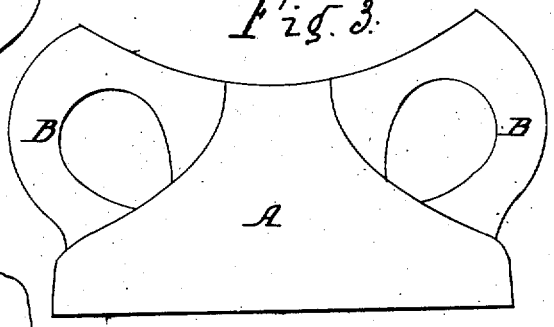
Figure 3 is a side elevation of the cast base and handles of the lamp.
Figure 1:
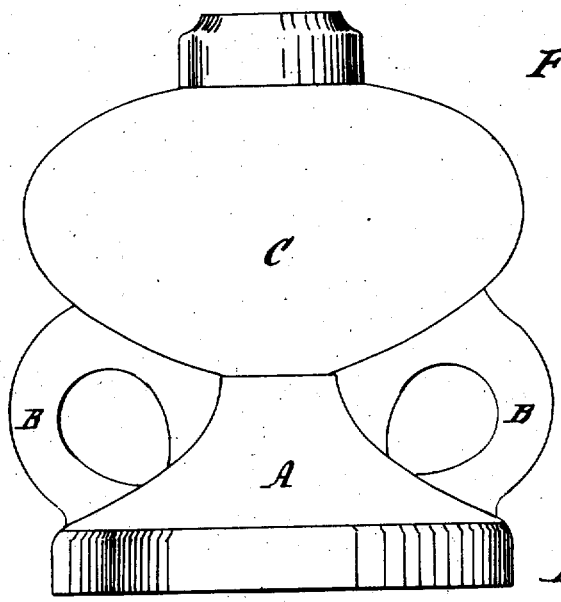
Figure 1 is a side elevation of the improved lamp, showing two handles upon it.

It will be seen, by reference to fig. 3, that the upper ends of the handles B B and upper end of the conical base A are formed so as to leave a concave seat, into which the bottom of the bowl C is received, and to which this bowl is united. Thus the handles and cone-base are made to serve as a support for and a means of securing the bowl in its place.

We have represented in the drawings a lamp, having two handles cast or pressed on the base, A, and aranged diametrically opposite each other, and we prefer to construct the lamps in this manner, for convenience and safety in handling them, and in passing them from one person to another. For it will be seen that the lamp with two handles can be taken from a person's hand by the handle which is opposite that held by such person; consequently, lamps of this kind, viz, with two handles, will not be liable to fall from the hand, and it will not be necessary to soil the fingers with oil, which is usually on the bowls of lamps.

We do not desire to confine the process of making lamps to the two handles, although greater strength and usefulness are obtained by having two handles, and by this process two handles can be made nearly as quick and as cheap as one.

Having described the invention, what we claim as new, and desire to secure by Letters Patent under this division, is—

1. The construction of the base, A, and the two handles B B, of one piece, for receiving a blown-glass bowl or reservoir, C, substantially as described.

2. A pressed base, A, produced with one or two handles upon it, and having a globe, C, blown upon and united to the base and handle or handles, substantially as described.

3. The construction of the base, A, and handle or handles B, in one piece by casting, and with a concave seat, for supporting and having blown upon the same a bowl or oil-reservoir, substantially as described.

Witnesses:

E. G. KREHAN,
A. P. NORTON.

DANIEL C. RIPLEY,
GEORGE DUNCAN,
JACOB STRICKEL,
N. KUNZLER,
*Constituting the Firm of Ripley & Co.*